March 30, 1965
T. A. COFFEE
3,176,138
OPTICAL COMMUNICATION SYSTEM WITH MODULATED
C.R.T. LIGHT SOURCE
Filed Oct. 17, 1962
2 Sheets-Sheet 1
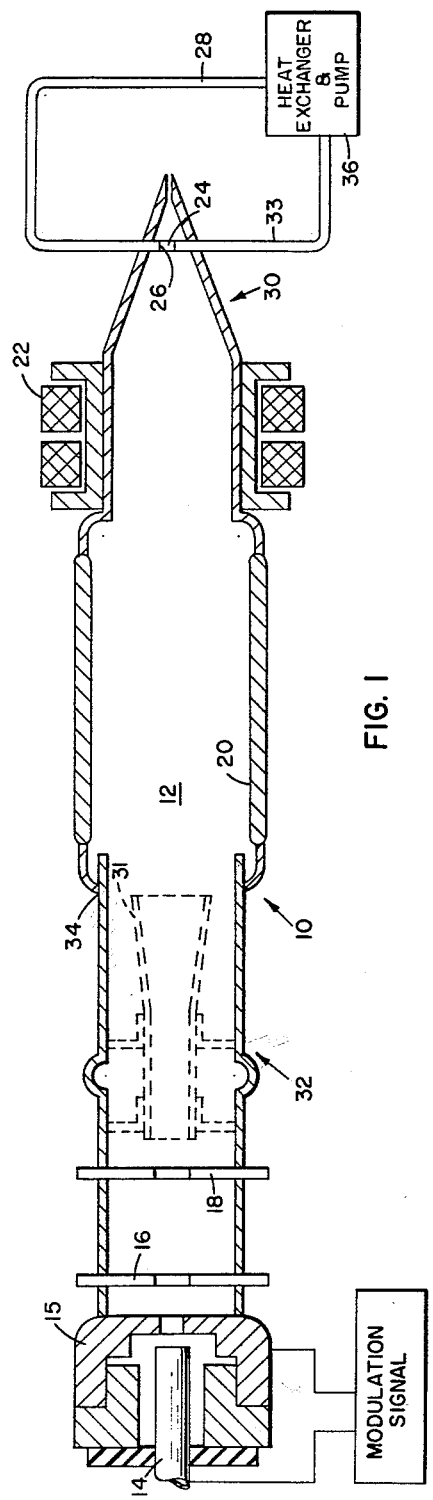
FIG. 1
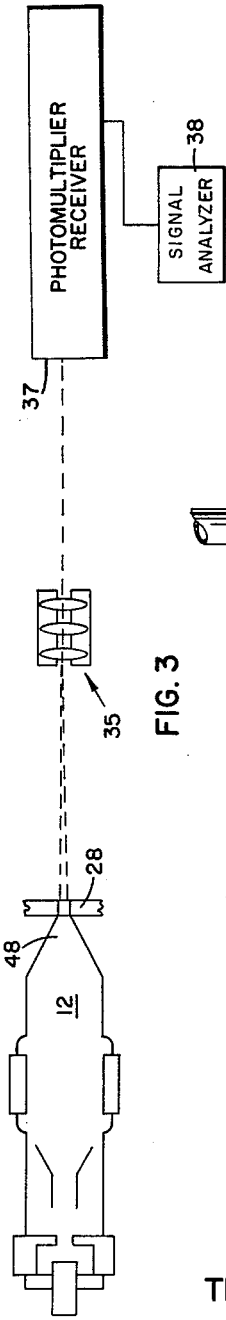
FIG. 3
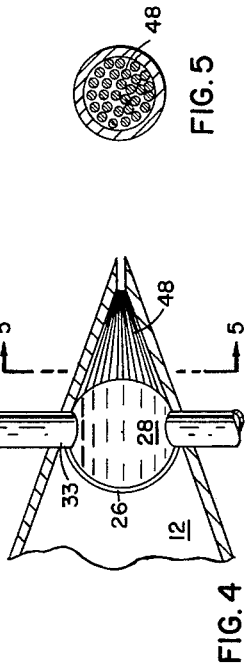
FIG. 5
FIG. 4
Thomas A. Coffee,
    INVENTOR.
BY  S. J. Rotondi
    A. T. Dupont
    W. P. Murphy

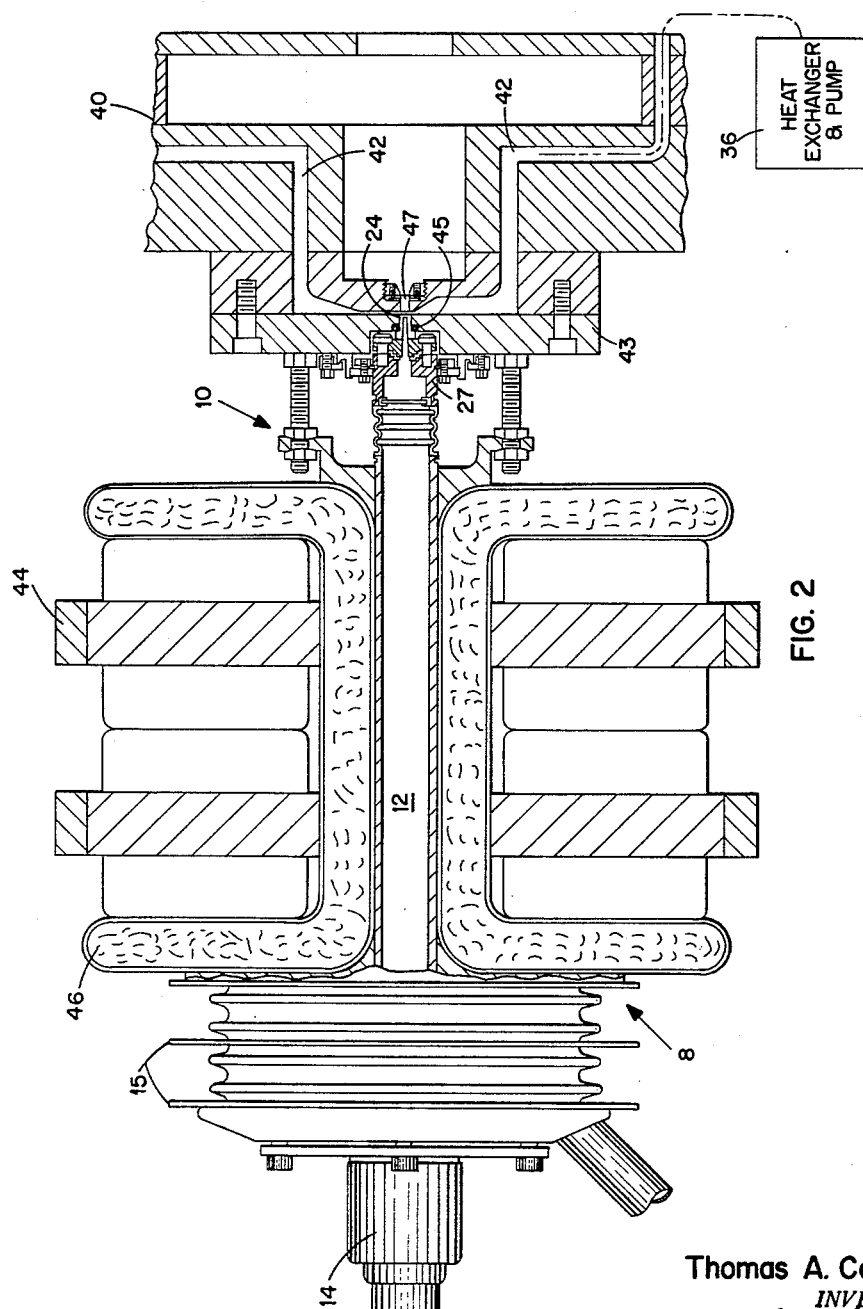

United States Patent Office 3,176,138
Patented Mar. 30, 1965

3,176,138
OPTICAL COMMUNICATION SYSTEM WITH MODULATED C.R.T. LIGHT SOURCE
Thomas A. Coffee, 745 Del Monte, Las Cruces, N. Mex.
Filed Oct. 17, 1962, Ser. No. 231,302
5 Claims. (Cl. 250—199)
(Granted under Title 35, U.S. Code (1952), sec. 266)

The invention described herein may be manufactured and used by or for the Government for governmental purposes without the payment of any royalty thereon.

This application pertains to apparatus for generation and modulation of radiant energy and, more particularly, to electromagnetic energy generation and modulation by electron beam excitation of a medium capable of photon emission responsive to the excitation.

Conjestion of radiation in the atmosphere has reached a high density and the rapidly expanding use of sources of electrical radiation in the communications range is increasing interference at a rate to confront the art of intelligence communications with serious problems in frequency allocation and bandwidth requirements. To provide a radiation mechanism and yet avoid the aforementioned problems I propose to utilize a device for generation and propagation of electromagnetic waves in the infrared, ultraviolet, visible or near-visible portions of the electromagnetic spectrum as a means for intelligence communications. Any apparatus operating in this portion of the electromagnetic spectrum would inherently have wide bandwidth capabilities, without interference to existing systems.

An object of the present invention, therefore, is to provide an apparatus for generation and modulation of electromagnetic radiation in the visible and adjacent portions of the spectrum.

A still further object of the present invention is to provide such apparatus disposed for novel means of electron beam excitation of phosphors.

In one embodiment of the present invention a cathode ray tube is provided at its forward end with a conduit or aperture through which a fast moving activating fluid capable of photon emission, flows. The conduit is provided with an electron permeable window and the electrons generated by the cathode ray device penetrate the window to excite the medium and thereby produce an output of high intensity light. The input signal to the cathode ray tube can be controlled to modulate the output radiation and transmit the desired data. A receiver, such as a photomultiplier tube or other photon sensitive device detects the transmitted data.

Emissions from phosphors sufficient for such applications requires high electrical power densities which heats the medium appreciably. Therefore, a heat exchanger is provided in the conduit to provide a recirculating system in which the medium is its own coolant.

The permeable foil window may be made of aluminum, beryllium, nickel or any other suitable material.

The medium to be activated by electron bombardment for photon emission may be liquid organic phosphors, crystalline phosphors, or liquid cooling agents having particles of inorganic phosphors such as zinc-cadmium-sulfide or other inorganic or organic solids held in suspension or moved past the electron window as slurries. By utilizing phosphor material whose phosphorescence will completely decay in two nanoseconds (billionths of seconds), the device will have potential modulation frequency capabilities in the gigacycle bandwidth (1 billion cycles per second).

To change the frequency of emission it is only necessary to change the phosphor material so as to emit at the desired frequency. Many cathodoluminescent gases, such as helium and neon, may also be used as the activating medium.

The principles of the present invention will be better understood from the following detailed description taken in conjunction with the accompanying drawings in which:

FIGURE 1 is a schematic illustration of one embodiment of my invention showing a cathode ray tube disposed for electron excitation of a photon emissive medium which is positioned at the forward end of the tube;

FIGURE 2 is an elevational view partially in section showing a light generation device including a cathode ray tube having a separable housing disposed at the forward end of the tube to enclose the medium;

FIGURE 3 is a schematic view of a light generation device as used in a communications system;

FIGURE 4 is an enlarged view of the forward end of the cathode ray device of FIGURE 1, illustrating another embodiment of the present invention, using fiber optics for concentrating the light beam; and FIGURE 5 is a sectional view along line 5—5 of FIGURE 4 illustrating the bundle of fibers used to focus the beam.

As shown in FIGURE 1, an apparatus 10 is disposed for generation and propagation of light. The apparatus comprises a cathode ray unit which includes a body 12, a cathode 14, a control grid 15, an anode 16, a limiting disc 18, and a post acceleration graphite spiral 20.

Quadrapole magnets 22 may be mounted on body 12 to aid in focusing the electron beam to a small spot on an electron permeable window 24 mounted in an aperture 26 of a glass conduit 28. The conduit is mounted at the forward end of 30 of body 12. The rearward portion 32 of the body may be made of ceramic material or may be of stainless steel. The forward portion 30 may be a glass cylinder sealed to the metal body by means of a glass sealing metal alloy as shown at 34. Deflection plates 31 as shown in FIGURE 1 may be used to provide beam deflection for scanning purposes if desirable. Conduit 28 is secured at the forward end 30 of the apparatus and is disposed in communication with a heat exchanger 36. A fast moving photon emissive medium such as a liquid phosphor 33 is enclosed in conduit 28 for bombardment by electrons and for recirculation through the heat exchanger to absorb the heat generated by the electron bombardment.

In operation, cathode 14 is modulated to emit electrons which are accelerated by the graphite spiral 20 for penetration of electron permeable window 24 and subsequent penetration and excitation of the phosphor to cause photon emission. The photons are emitted at a selected frequency and may be collimated by lens 35 to form a narrow beam for transmission to a receiver 37 (FIG. 3). The receiver for the beam of light may include a photomultiplier tube. The photo-cathode of which would receive the modulated light beam and convert it into electrical impulses. Receiver 37 and a signal analyzer 38 are series connected to the tube to read out the data transmitted by the light beam. Modulation of the electron-beam excitation of the phosphor can be accomplished by intensity modulation of the beam at the gun by applying a signal, in conventional manner, between control grid 15 and cathode 14.

A further embodiment of my invention disposed for similar operation is shown in FIGURE 2 where elements corresponding to those shown in FIGURE 1 are identified by like reference numerals. However, this embodiment includes such structural modifications as a light source device 10, including a separable cathode ray tube 8, which can be separated from the medium to be activated without impairing the vacuum of the cathode ray tube. Tube 8 may be separated to permit the medium to be changed and thus change the frequency of the emitted photons.

As shown in FIGURE 2, a light source device 10 comprises a cathode ray tube 8 including a body 12, a cathode 14, and a plurality of grids 15. A housing 40 mounted at the forward end of body 12 for support thereof is provided with a symmetrical aperture 42 for enclosing the activating medium. The aperture is disposed in communication with heat exchanger 36 to form a recirculating unit for the medium and carry away the heat generated by electron bombardment of the medium. The housing is releasably secured to tube body 12 to permit removal thereof without impairing the vacuum in the cathode ray tube.

A member 27 is provided at the forward end of body 12 and includes a window 24, of beryllium, aluminum, nickel or any of many other materials. Window 24 is secured to stainless steel support 43 which is releasably secured to housing 40 and which is sealed onto the cathode ray tube 8 by a crushable copper gasket 45.

Member 27 may be constructed entirely of a window material such as beryllium, in which instance the window aperture portion of the structure is machined to the specified thickness.

Housing 40 may be made of nylon to provide heat insulation and distribute the medium to the conduit.

Magnet 44 is electrically and mechanically adjustable to focus the electron beam to a minimum diameter. A beam diameter of 30 microns (with optimum electron optical performance) to 250 microns (average electron optics focusing performance) is directed through window 24 where a light source 1.2 to 2 times the electron spot diameter is produced. The effective source size is to some extent also determined by the power level (electron beam density) applied. A beam diameter of 0.010 inch directed through window 24 produces a 0.020 inch light source. A window forming member 47, such as a quartz rod, may be mounted in housing 40 opposite window 28 to retain the medium in aperture 42 and to collimate the beam.

A further embodiment of the device is shown in FIGURE 4 with elements corresponding to those shown in FIGURE 1. The illustration in FIGURE 4 shows the forward end of cathode ray body 12. In this embodiment the conduit 28 is mounted adjacent a plurality of transparent quartz fibers or similar ultraviolet transmitting material 48 which taper in approximately a 10:1 ratio of entrance to exit diameters.

Each individual fiber of the bundle of fibers is tapered in such a way that a large dimension source of high intensity light will, upon entering the wider aperture end of the fibers, traverse to the smaller exit aperture, thus increasing the power density at the exit aperture according to relationship of the densities per centimeter squared (d./cm.$^2$) of the entrance and exit apertures, minus the loss accrued in traversing the optical density of the fibers. Since the length of such tapered fiber bundle is quite short in relation to the entrance and exit aperture dimensional size relationship, vast gains in photon power density result.

It should be understood that the specific arrangements of the cathode ray generator, electron accelerator, and electron window are merely illustrative of the general principles involved and that other arrangements and modifications may be resorted to that are within the inventive concept of the present invention. For example, an arrangement of simpler configuration may be employed for special purposes in which the electron emitting cathode, control grid structure and the anode (which in this instance is the permeable foil window) are all embodied in as close proximity as high voltage insulation parameters will allow. In this arrangement no electron optics are required to focus electrons onto the permeable foil windows. The emitted electrons being in very close proximity to the high voltage charge on the electron window anode are so strongly attracted that sufficient acceleration is accomplished to cause adequate penetration of the window after impact.

While the foregoing has been directed to a few general forms of my invention it will be understood that this has been for illustrative purposes only and it is not desired to limit this application to these forms since other modifications may be resorted to that are within the spirit and scope of the appended claims.

The following invention is claimed:
1. A device disposed for generation, modulation and propagation of radiant energy comprising:
   (a) a cathode ray tube for directing a flow of electrons to a predetermined point;
   (b) a conduit mounted in the forward end of said cathode ray tube and provided with a pair of windows disposed in diametrically opposed relation, the first of said windows being of beryllium and disposed at said predetermined point for transmission of said electron flow;
   (c) a liquid phosphor medium disposed in said conduit for flow between said windows for excitation and generation of radiant energy in the infrared, ultraviolet and visible portions of the electromagnetic wave spectrum responsive to said electron flow;
   (d) the second of said windows being transparent to radiant energy in the infrared, ultraviolet, and visible portions of the electromagnetic spectrum, said second window disposed for passage of said radiant energy therethrough responsive to the generation;
   (e) a heat exchanger connected to said conduit for cooling and recirculating said medium through said conduit; and,
   (f) means for collimating said radiant energy for transmission thereof.
2. The device as in claim 1 including:
   (a) a housing removably attached to the forward end of said tube for enclosing said conduit;
   (b) said first window being electron permeable and disposed in the forward end of said tube adjacent said conduit; and
   (c) said second window being disposed in said housing adjacent said first window.
3. The device of 2 wherein said second window is a quartz crystal.
4. The device of claim 1 wherein said means for collimating said radiant energy comprises a bundle of quartz fibers disposed adjacent said second window, said fibers being tapered in substantially a 10:1 entrance to exit diameter ratio for concentration of the emitted radiant energy.
5. A communications system for operation in the visible, infrared and ultraviolet wavelengths of the electromagnetic spectrum including a transmitter and receiving means, said transmitter comprising:
   (a) a cathode ray tube provided with modulation means, said tube disposed for directing modulated flow of electrons to a predetermined point;
   (b) a conduit mounted in the forward end of said cathode ray tube and provided with a pair of windows being of beryllium and disposed in diametrically opposed relation, the first of said windows disposed at said predetermined point for transmission of the electron flow;
   (c) a liquid phosphor medium disposed in said conduit for flow between said windows and for excitation by said electrons for generation of radiant energy corresponding in frequency to said modulated electrons;
   (d) said second of said windows transparent to radiant energy in the infrared, ultraviolet, and visible portions of the electromagnetic spectrum, said second window disposed for passage of said radiant energy therethrough responsive to the generation;

(e) means associated with said transmitter for collimating said radiant energy;
(f) said receiving means comprising a photomultiplier tube for detecting said radiant energy and conversion thereof to electrical signals; and a signal analyzer for receiving and analyzing said electrical signals; and,
(g) a heat exchanger connected to said conduit for cooling and recirculating said medium through said conduit.

References Cited by the Examiner

UNITED STATES PATENTS

| | | | |
|---|---|---|---|
| 2,251,332 | 8/41 | Gray | 313—87 |
| 2,538,062 | 1/51 | Touvet | 250—199 |
| 2,665,390 | 1/54 | Zunick et al. | 313—29 |
| 2,999,163 | 9/61 | Beese | 250—199 X |
| 3,058,021 | 10/62 | Dunn | 88—1 |

DAVID G. REDINBAUGH, *Primary Examiner.*